(12) United States Patent
Kim

(10) Patent No.: US 8,327,514 B2
(45) Date of Patent: Dec. 11, 2012

(54) APPARATUS FOR RIVETTING

(75) Inventor: Taek-hyun Kim, Busan-si (KR)

(73) Assignee: Gunyang Trunet, Co., Ltd. (KR)

( * ) Notice: Subject to any disclaimer, the term of this patent is extended or adjusted under 35 U.S.C. 154(b) by 698 days.

(21) Appl. No.: 12/500,524

(22) Filed: Jul. 9, 2009

(65) Prior Publication Data

US 2009/0265906 A1 Oct. 29, 2009

Related U.S. Application Data

(63) Continuation of application No. PCT/KR2008/006511, filed on Nov. 5, 2008.

(30) Foreign Application Priority Data

Nov. 5, 2007 (KR) .................. 10-2007-0112060

(51) Int. Cl.
- B23P 11/00 (2006.01)
- B29C 35/02 (2006.01)
- B29C 65/02 (2006.01)
- B21K 1/44 (2006.01)
- B21K 1/58 (2006.01)

(52) U.S. Cl. .................. 29/243.54; 264/404; 264/249; 470/32

(58) Field of Classification Search .............. 29/243.54; 264/404, 249; 470/32, 33
See application file for complete search history.

(56) References Cited

U.S. PATENT DOCUMENTS

| | | | | |
|---|---|---|---|---|
| 1,365,664 A * | 1/1921 | Barringer | ................ | 29/243.54 |
| 2,507,638 A * | 5/1950 | Leahy | .............. | 29/505 |
| 3,499,808 A * | 3/1970 | Obeda | ............ | 264/249 |
| 3,562,893 A * | 2/1971 | Winslow et al. | ............ | 29/243.53 |
| 4,767,298 A * | 8/1988 | Bocchicchio et al. | ........ | 425/112 |
| 5,018,957 A * | 5/1991 | Assink et al. | .................. | 425/112 |
| 5,423,938 A * | 6/1995 | Hofius et al. | .................. | 156/497 |

(Continued)

FOREIGN PATENT DOCUMENTS

EP 0965400 A3 11/2000

OTHER PUBLICATIONS

International Search Report for PCT/KR2008/006511 (WO 2009/061123 A3), WIPO, Apr. 24, 2009.

*Primary Examiner* — Lee D Wilson
*Assistant Examiner* — Alvin Grant
(74) *Attorney, Agent, or Firm* — Park & Associates IP Law, P.C.

(57) ABSTRACT

A riveting apparatus includes a hot air pipe; a connection pipe coupled to the hot air pipe; a forming tool having a configuration in which peripheral and center portions project downward and portions existing therebetween are curved upward, defined with discharge holes which extend in axial and radial directions, and coupled to a lower end of the connection pipe so that hot air having passed through the connection pipe can be discharged through the discharge holes to heat an end of a rivet to thereby allow the forming tool to form the end of the rivet into the shape of a head; a moving unit coupled to the hot air pipe or the connection pipe to move the forming tool upward and downward; and a guide surrounding the forming tool so that hot air discharged through the discharge holes can be directed toward the end of the rivet.

6 Claims, 8 Drawing Sheets

U.S. PATENT DOCUMENTS

| | | | |
|---|---|---|---|
| 6,099,291 A * | 8/2000 | Lanser | 425/508 |
| 6,298,533 B1 * | 10/2001 | Nishimura et al. | 29/243.5 |
| 6,544,022 B2 * | 4/2003 | Lanser et al. | 425/3 |
| 6,649,114 B2 | 11/2003 | Lochner et al. | |
| 6,840,755 B1 * | 1/2005 | Cook | 425/508 |
| 7,076,864 B2 * | 7/2006 | Malaka | 29/798 |
| 8,006,361 B2 * | 8/2011 | Hutter et al. | 29/243.518 |
| 2003/0116885 A1 * | 6/2003 | Lessard et al. | 264/249 |
| 2006/0175729 A1 | 8/2006 | Braun | |
| 2007/0057394 A1 * | 3/2007 | Linehan | 264/40.6 |
| 2010/0269312 A1 * | 10/2010 | Wagner et al. | 24/400 |
| 2010/0319173 A1 * | 12/2010 | Balle et al. | 29/243.54 |

\* cited by examiner (a)

(b)

(c)

APPARATUS FOR RIVETING

REFERENCE TO RELATED APPLICATIONS

This a continuation of pending International Patent Application PCT/KR2008/006511 filed on Nov. 5, 2008, which designates the United States and claims priority of Korean Patent Applications No. 10-2007-0112060 filed on Nov. 5, 2007, the entire contents of which are incorporated herein by reference.

FIELD OF THE INVENTION

The present invention relates to a riveting apparatus, and more particularly, to a riveting apparatus wherein a riveting operation is implemented in a manner such that hot air is discharged through discharge holes defined through a forming tool in axial and radial directions to melt an end of a rivet, the forming tool is then lowered to apply pressure to the end of the rivet and form the end of the rivet into the shape of a head, and cooling air is supplied to the forming tool and a connection pipe connected to the upper end of the forming tool to decrease the temperature of the forming tool and thereby cool the end of the rivet formed into the shape of a head and brought into contact with the forming tool.

BACKGROUND OF THE INVENTION

As is generally known in the art, when a plurality of plastic members are stacked and fastened together as in materials used in the interior of vehicles, a riveting method is used in which a hole is defined through the plastic members adjacent to the edge of the plastic members, a rivet formed with a head on a first end thereof is inserted through the hole, and then a second end of the rivet is formed into the shape of a head.

In the case of materials used in the interior of vehicles, since the rivets are made of synthetic resin, differently from the case in which the rivets are made of a metallic material, a riveting operation is implemented in a manner such that synthetic resin is melted, one end of each rivet is formed into the shape of a head by applying pressure using a forming tool, and then the rivet is cooled.

In order to implement the riveting operation, a conventional riveting apparatus as shown in FIG. 1 has been disclosed in the art. In the conventional riveting apparatus, a heater 12 having an electric heating wire therein is coupled to the upper end of a forming tool 14 which functions to form an end of a rivet 1 into the shape of a head. If electric power is supplied, the heater 12 heats the forming tool 14 so that the temperature of the forming tool 14 is increased.

In the riveting apparatus, due to the fact that the forming tool 14 itself is heated, after the forming tool 14 is heated, the forming tool 14 is lowered such that the heating and the forming of the end of the rivet 1 can be simultaneously implemented.

The conventional riveting apparatus, which is constructed in such a way as to melt the end of the rivet 1 using the forming tool 14, provides the advantages of having a simple construction and being able to be fabricated at small cost. However, the conventional riveting apparatus suffers from drawbacks because, since the heating and the application of pressure are simultaneously implemented, pressure is likely to be applied when the end of the rivet 1 is not completely melted, and thereby, the end of the rivet 1 is likely to be inadequately formed into the shape of a head. Also, since the pressure can be transmitted to plate members 2, the plate members 2 are likely to be deformed or whitening can occur in the plate members 2, so that the quality of an end product deteriorates.

Further, because the temperature of the forming tool 14 slowly decreases upon cooling, it takes a long time to finish the riveting operation.

In another conventional riveting apparatus constructed as shown in FIG. 2(a), instead of directly heating a forming tool as described above, hot air is supplied around a rivet 1 to melt the rivet 1, and then a forming tool 24 is lowered to form an end of the rivet 1 into the shape of a head.

In this riveting apparatus, if plate members 2 and a rivet 1 reach a preset position, as shown in FIG. 2(b), a hot air supply unit 22 for supplying hot air is lowered to surround the end of the rivet 1 and then supplies hot air around the end of the rivet 1. Thereafter, after a predetermined time has elapsed, the hot air supply unit 22 is raised as shown in FIG. 2(c), and a punch, to which the forming tool 24 is coupled, is lowered to form the end of the rivet 1 into the shape of a head. Next, cooling air is supplied to cool the end of the rivet 1 which was formed into the shape of a head.

If hot air is used just as described above, since the forming tool 24 can be lowered to form the end of the rivet 1 after the end of the rivet 1 has sufficiently melted, the quality of the riveting operation can be improved upon when compared to the case of FIG. 1 in which the heating and the forming are simultaneously implemented.

Nevertheless, this conventional riveting apparatus has a drawback in that, since a driving unit for lowering and raising the hot air supply unit 22 and a driving unit for lowering and raising the forming tool 24 should be separately provided, the construction of the riveting apparatus becomes complicated and the fabrication cost of the riveting apparatus increases. Also, since the forming of the end of the rivet 1 is implemented by raising the hot air supply unit 22 after the end of the rivet 1 is heated by lowering the hot air supply unit 22, the time required to implement the riveting operation is extended.

Still another conventional riveting apparatus as shown in FIG. 3 has been developed by KIEFEL of Germany.

Referring to FIG. 3, in this conventional riveting apparatus, a heater 32 is coupled to the upper end of a forming tool 34, and the heater 32 and the forming tool 34 are surrounded by a housing. As air is supplied into the space defined in the housing, the air heated by the heater 32 is supplied toward an end of a rivet 1 to melt the end of the rivet 1, and then, the forming tool 34 is lowered to form the end of the rivet 1 into the shape of a head.

The conventional riveting apparatus provides an advantage in that, since it has a simple construction and can form the end of the rivet 1 into the shape of a head using hot air, the quality of a riveting operation can be elevated.

Nonetheless, the conventional riveting apparatus encounters a problem in that, because the size of the housing which surrounds the forming tool 34 and the heater 32 can not be increased beyond a certain size limit, the size of the heater 32 disposed in the housing is restricted and the amount of hot air for heating the end of the rivet 1 is limited, whereby a time required for melting the end of the rivet 1 can not but be extended. In particular, since hot air is supplied only to the outer surface of the end of the rivet 1, a lengthy period is required to melt the end of the rivet 1 up to the inside thereof. Further, when cooling the rivet 1, because the forming tool 34 and the heater 32 should also be cooled, the cooling time is lengthened. On the other hand, when heating the rivet 1, because the forming tool 34 and the heater 32 should be heated again, energy loss increases and it takes a long time to completely finish the riveting operation.

SUMMARY OF THE INVENTION

Accordingly, the present invention has been made in an effort to solve the problems occurring in the related art, and an object of the present invention is to provide a riveting apparatus which can improve upon the quality of a riveting operation, increase energy efficiency, shorten the time required for riveting, and improve productivity.

Another object of the present invention is to provide a riveting apparatus which has a simple construction and can be easily fabricated at small cost.

In order to achieve the above object, according to one aspect of the present invention, there is provided a riveting apparatus suitable for fastening a plurality of plate members by forming an end of a rivet, made of synthetic resin, into the shape of a head through heating and pressing, the apparatus comprising a hot air pipe for supplying hot air; a connection pipe having the shape of a hollow tube and coupled to a lower end of the hot air pipe; a forming tool having a configuration in which a peripheral portion and a center portion project downward and portions existing therebetween are curved upward, defined with discharge holes which extend in axial and radial directions, and coupled to a lower end of the connection pipe so that hot air having passed through the connection pipe can be discharged through the discharge holes to heat the end of the rivet to thereby allow the forming tool to form the end of the rivet into the shape of a head; a moving unit coupled to the hot air pipe or the connection pipe to move the forming tool upward and downward; and a guide configured to surround the forming tool so that hot air discharged through the discharge holes, which are defined in the forming tool and extend in the radial directions, can be directed toward the end of the rivet.

According to another aspect of the present invention, a plurality of cooling fins are formed on an outer surface of the connection pipe.

According to another aspect of the present invention, a plurality of grooves are defined on a lower end of the guide so that hot air can be discharged to the outside after heating the end of the rivet.

According to another aspect of the present invention, a cold air pipe for supplying cold air is connected to the guide to cool the forming tool and the connection pipe after the end of the rivet is formed into the shape of a head.

According to still another aspect of the present invention, the guide is installed in a manner such that it surrounds the connection pipe and can be moved upward and downward on the connection pipe, and a spring is disposed on the guide such that the guide presses the plate members by virtue of elastic force of the spring when the forming tool is lowered.

According to a still further aspect of the present invention, at least one stripper is coupled to an outer surface of the guide to project beyond the lower end of the guide so that the lower end can be prevented from being brought into direct contact with a surface of a plate member.

Thanks to the above features of the present invention, advantages are provided in that, since a riveting operation is implemented such that hot air is supplied and is passed through discharge holes defined in a forming tool to heat a rivet and then an end of the rivet is formed into the shape of a head, the quality of the riveting operation can be improved upon, energy efficiency can be increased, and heating and cooling times can be shortened, whereby productivity can be improved.

Further, because the riveting apparatus has a simple construction, it can be easily fabricated at small cost, whereby economic viability can be ensured.

DESCRIPTION OF REFERENCE NUMERALS FOR MAIN PARTS IN DRAWINGS

| | |
|---|---|
| 1: rivet | 2: plate members |
| 12: heater | 14: forming tool |
| 22: hot air supply unit | 24: forming tool |
| 32: heater | 34: forming tool |
| 100: connection pipe | 110: cooling fins |
| 200: hot air pipe | 300: forming tool |
| 310: discharge holes | 410: hydraulic cylinders |
| 420: plate | 500: guide |
| 510: stripper | 520: spring |
| 530: cooling air pipe | 540: grooves |

DETAILED DESCRIPTION OF THE INVENTION

Hereafter, a riveting apparatus in accordance with an embodiment of the present invention will be described in detail with reference to the accompanying drawings.

Figure 1:
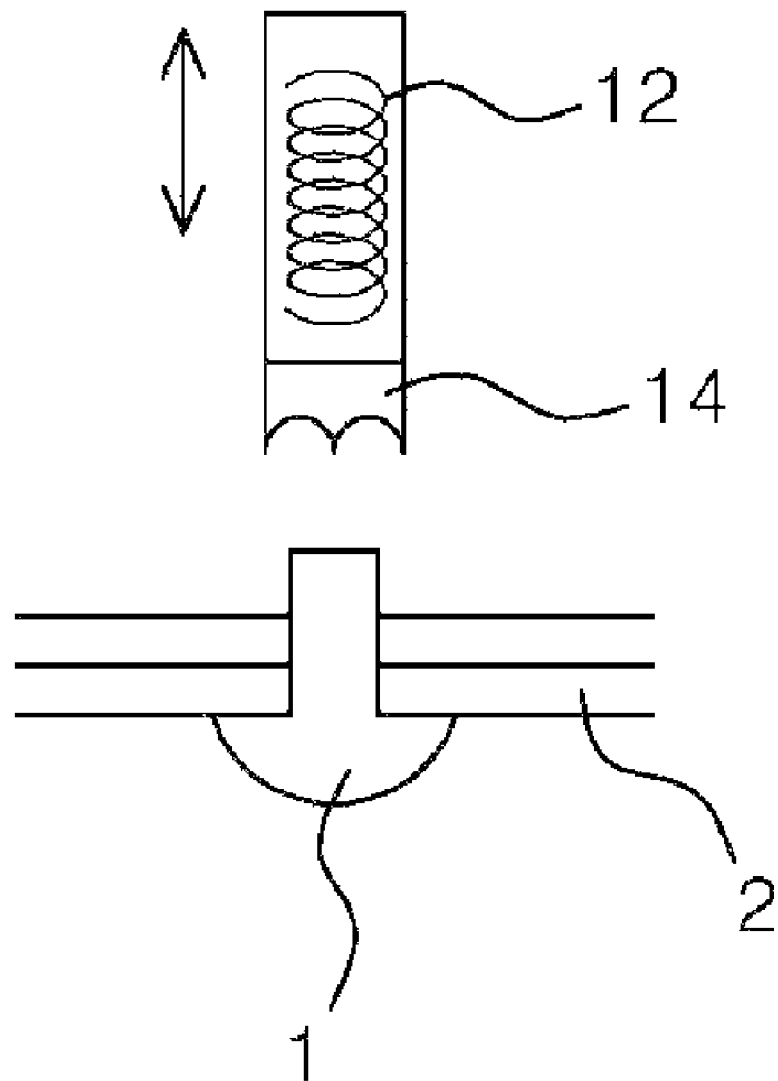
FIG. 1 is a sectional view illustrating a forming tool of a conventional riveting apparatus and plate members to be riveted.
Figure 2:
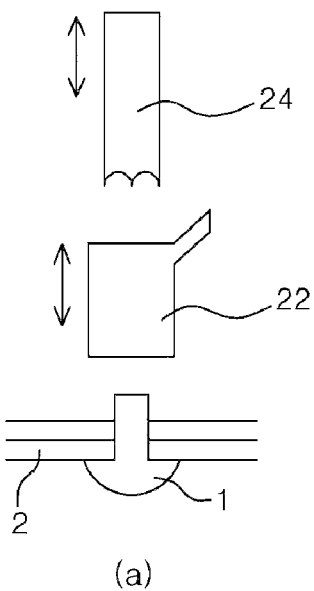
FIG. 2 is of sectional views illustrating the riveting operation of another conventional riveting apparatus.
Figure 2:
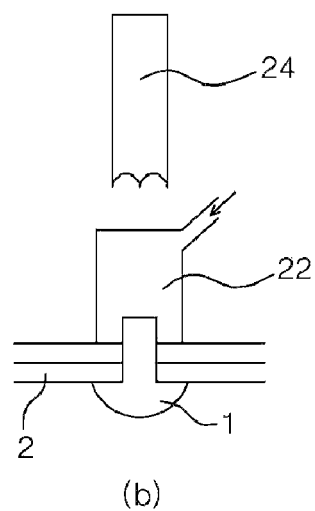
Figure 2:
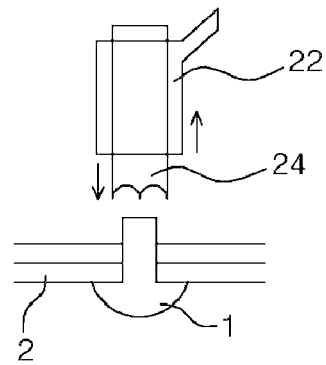
Figure 3:
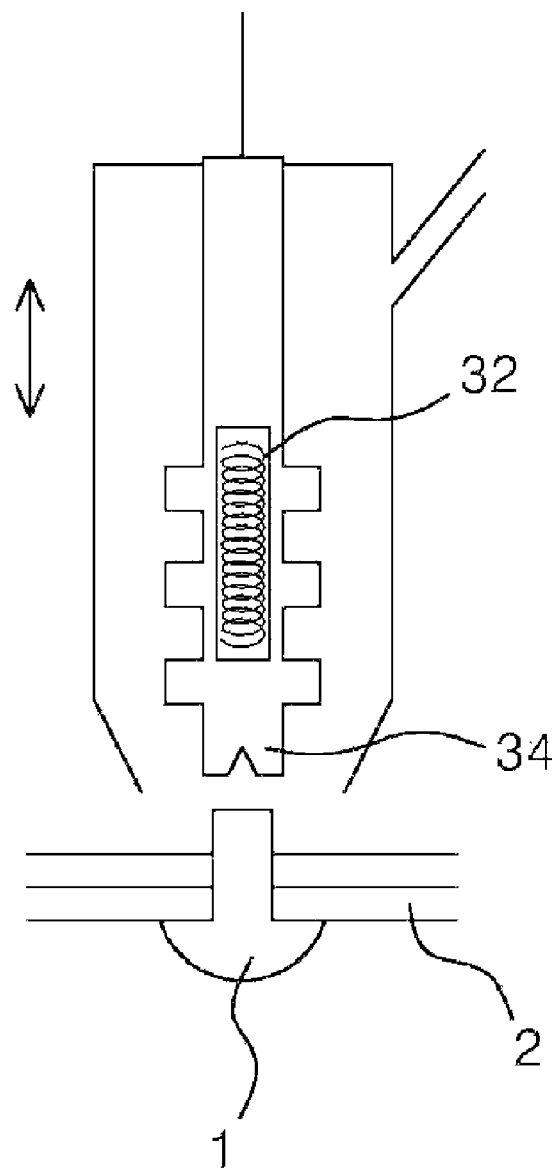
FIG. 3 is a sectional view illustrating still another conventional riveting apparatus.
Figure 4:
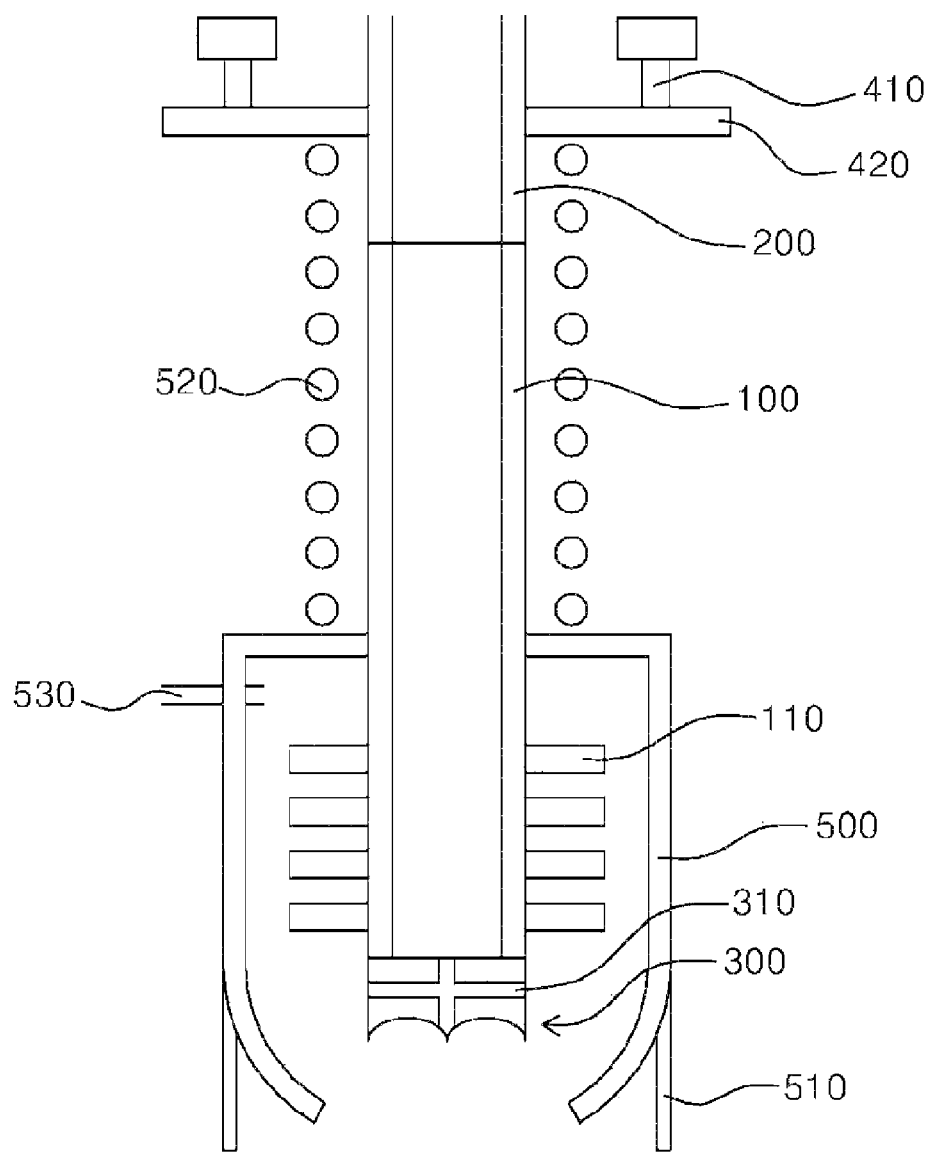
FIG. 4 is a sectional view illustrating a riveting apparatus in accordance with an embodiment of the present invention.

FIG. 4 is a sectional view illustrating a forming tool and other component parts of a riveting apparatus in accordance with an embodiment of the present invention.

Referring to FIG. 4, the riveting apparatus according to the present invention generally includes a hot air pipe 200, a connection pipe 100, a forming tool 300, a moving unit, and a guide 500.

First, the hot air pipe 200 will be described. The hot air pipe 200 has the shape of a hollow tube and defines a path through which hot air flows.

The connection pipe 100 also has the shape of a hollow tube, is coupled to the lower end of the hot air pipe 200, and defines a path through which hot air having passed through the hot air pipe 200 flows.

In order to promote heat transfer, the connection pipe 100 is made of a metallic material such as aluminum, which has high heat conductivity.

Next, the forming tool 300 will be described. The forming tool 300 is coupled to the lower end of the connection pipe 100 and has the shape of a flat disc. A plurality of discharge holes 310 are defined through the forming tool 300 such that a center hole 310 is defined through the center portion of the forming tool 300 to extend in an axial direction and radial holes 310 are defined to extend in radial directions and communicate with the center hole 310.

Hot air supplied through the connection pipe 100 is discharged through the discharge holes 310 which are defined in the forming tool 300 and extend in the axial and radial directions.

Referring to FIG. 4, the forming tool 300 has a configuration in which a peripheral portion and a center portion project downward and portions existing therebetween are curved upward, such that, when forming a rivet 1, the upper end of the rivet 1 can be rolled outward by the curved portions of the forming tool 300 to define the shape of a head.

It is preferred that the forming tool 300 be made of a metallic material having high heat conductivity so as to be easily heated and cooled.

The moving unit will be described below. The moving unit is coupled to the hot air pipe 200 or the connection pipe 100 such that the forming tool 300 can be moved upward and downward under the action of a spring 520. In the present embodiment, as shown in FIG. 4, the moving unit includes hydraulic cylinders 410 and a transmission plate 420 for transmitting the upward and downward moving force produced by the hydraulic cylinders 410 to the hot air pipe 200.

The reason why the transmission plate 420 is used resides in that a plurality of forming tools 300 are provided in the riveting apparatus to simultaneously form a plurality of rivets 1 and are moved together upward and downward by moving the transmission plate 420.

However, instead of raising and lowering the forming tool 300 using the transmission plate 420 as described above, it can be envisaged that the hydraulic cylinders 410 can be directly connected to hot air pipes 200 or connection pipes 100 which are placed over the forming tools 300 and that air cylinders, cams, etc. can be used in place of the hydraulic cylinders 410.

The guide 500 will be described below. The guide 500 functions to surround the forming tool 300 so that the hot air discharged through the discharge holes 310 defined in the forming tool 300 can be directed toward the rivet 300. To this end, the guide 500 is formed such that the diameter thereof gradually decreases from the upper end toward the lower end thereof so that hot air can impinge on the guide 500 and flow toward the rivet 1.

A cooling air pipe 530, through which cold air is supplied, is connected to a side of the guide 500 so that cooling air can be supplied through the cooling air pipe 530 to cool the forming tool 300 after the rivet 1 is formed into the shape of a head. At this time, when cooling the rivet 1 by supplying cooling air into the guide 500, in order to ensure that a cooling time is shortened and the lower end of the connection pipe 100 is also quickly cooled together with the forming tool 300, a plurality of cooling fins 110 are formed on the outer surface of the connection pipe 100 adjacent to the lower end thereof. The guide 500 is formed to also surround the cooling fins 110.

Figure 5:
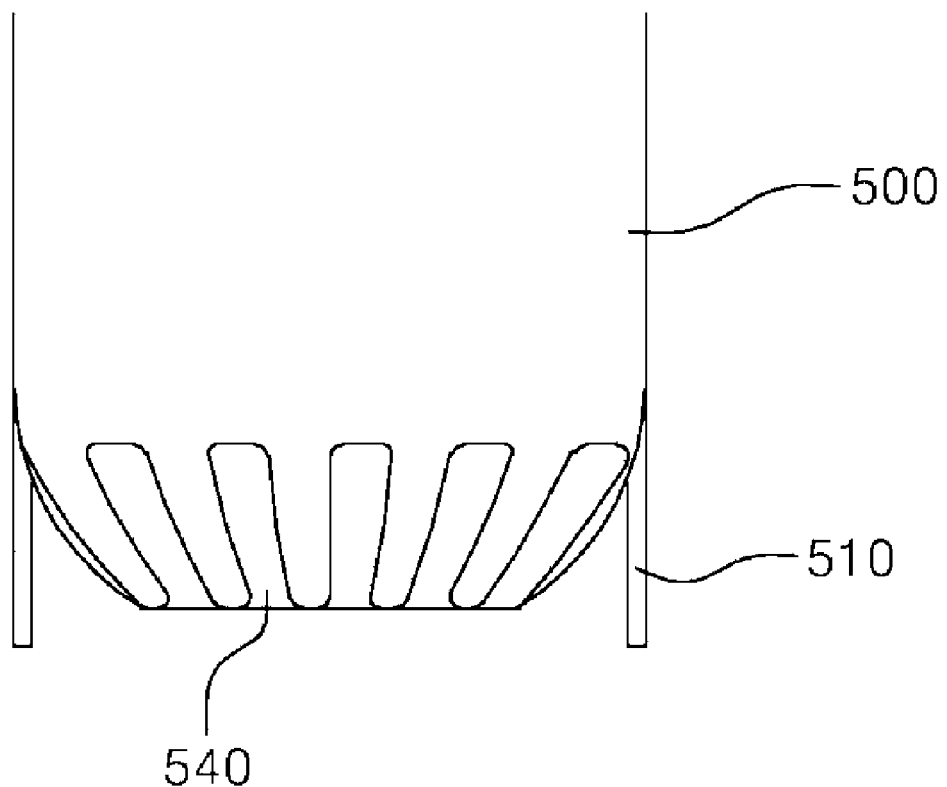
FIG. 5 is a front view illustrating a guide of the riveting apparatus according to the present invention.

As shown in FIG. 5, a plurality of grooves 540 are defined on the lower end of the guide 500 so that hot air or cold air having heated or cooled the rivet 1 and the forming tool 300 can be discharged to the outside through the grooves 540. Due to this fact, the hot air or cold air having passed on the rivet 1 and through the forming tool 300 can be discharged to the outside, and newly supplied hot air or cold air can be continuously directed to the rivet 1 so that the rivet 1 can be quickly heated or cooled.

The guide 500 is coupled to the connection pipe 100 in a manner such that it can be moved upward and downward. The spring 520 is disposed on the upper end of the guide 500. The guide 500 is structured to surround the forming tool 300 while being biased downward by the spring 520.

A plurality of strippers 510 are coupled adjacent to the lower end of the guide 500 to prevent the lower end of the guide 500 from being brought into direct contact with a plate member 2 when the forming tool 300 is lowered.

If the guide 500 is brought into direct contact with the plate member 2, a portion of the plate member 2, which comes into contact with the guide 500, is likely to be melted by the heat from the guide 500, and as a result, a flaw can be caused. The strippers 510 are used to prevent this problem.

The strippers 510 project downward from the lower end of the guide 500. Therefore, when the forming tool 300 is lowered, the strippers 510 are first brought into contact with the plate member 2 and thereby prevent the guide 500 from being brought into direct contact with the plate member 2. At this time, as the forming tool 300 is continuously lowered with the guide 500 stopped, the spring 520 is compressed to accumulate elastic force.

When the strippers 510 are brought into contact with the plate member 2, the strippers 510 press and fixedly hold the plate member 2 by virtue of the elastic force of the spring 520 so that the plate member 2 is prevented from being moved while the rivet 1 is formed.

Thereafter, if the forming tool 300 is raised, the guide 500 is kept stopped by the elastic force of the spring 520 while the forming tool 300 is moved a predetermined distance. Then, when the forming tool 300 is raised and exceeds the predetermined distance, the guide 500 is also raised together with the forming tool 300.

Hereinbelow, the functions and the effects of the riveting apparatus according to the embodiment of the present invention will be described with reference to the attached drawings.

Figure 6:
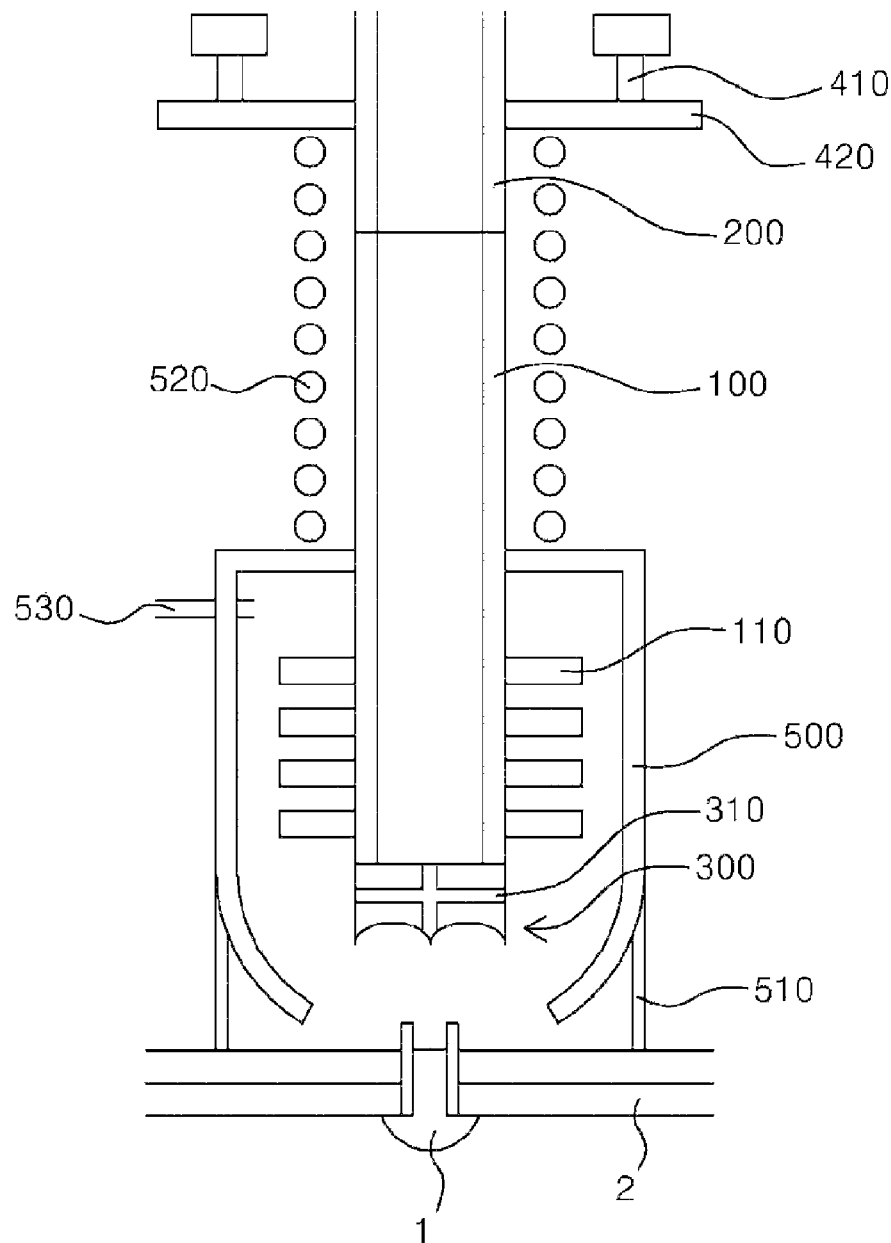
FIG. 6 is a sectional view illustrating the state in which a rivet is heated by the riveting apparatus according to the present invention.
Figure 7:
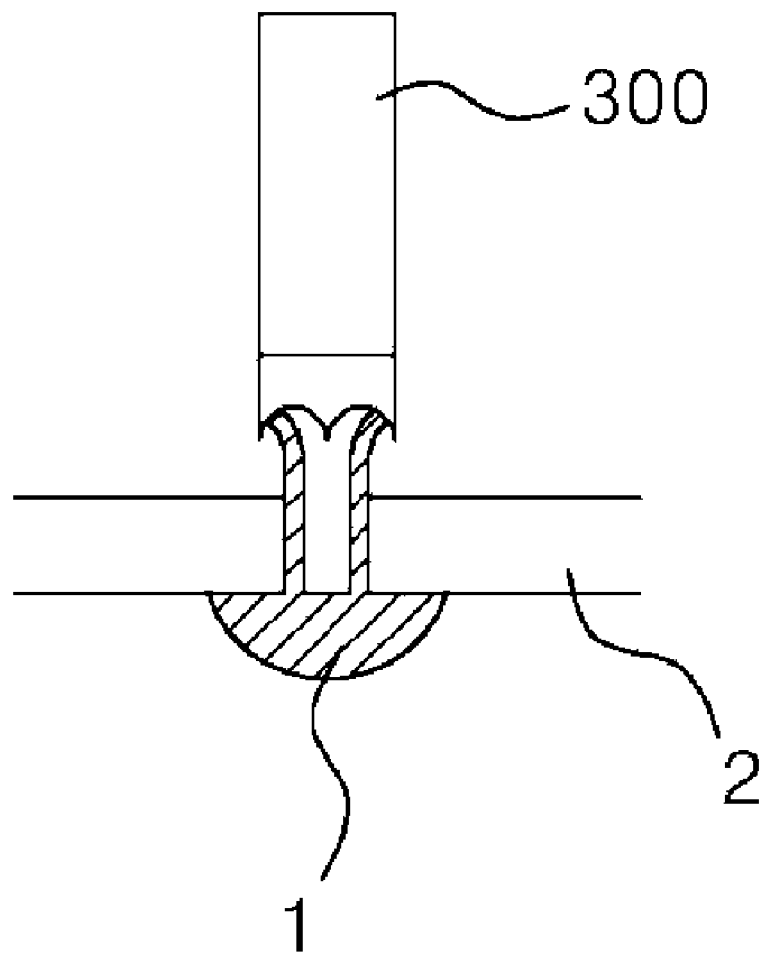
FIGS. 7 and 8 are sectional views illustrating the state in which an end of the rivet is formed into the shape of a head.
Figure 8:
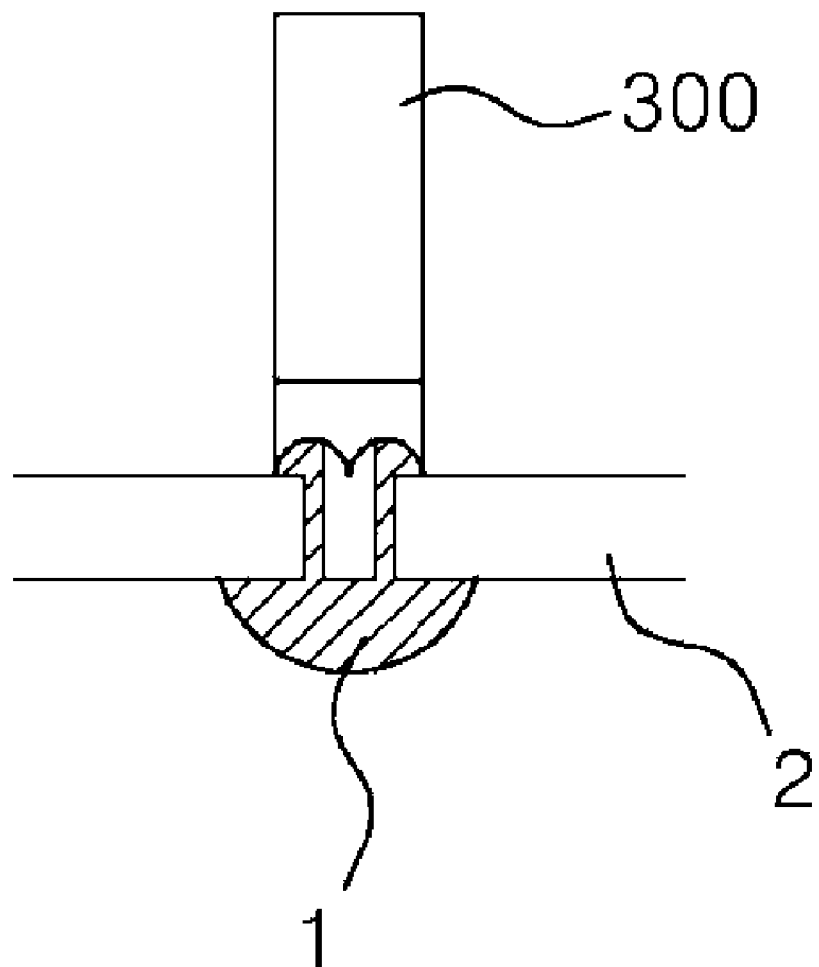

FIG. 6 is a sectional view illustrating the state in which the rivet 1 is heated by the riveting apparatus according to the present invention, and FIGS. 7 and 8 are sectional views illustrating the state in which the end of the rivet 1 is formed into the shape of a head by the forming tool 300.

First, referring to FIG. 6, hot air is supplied with the forming tool 300 placed above the rivet 1. Hot air having passed through the hot air pipe 200 and the connection pipe 100 is discharged in axial and radial directions through the discharge holes 310 defined in the forming tool 300. At this time, the hot air discharged in the axial direction heats the inner surface of the rivet 1, and the hot air discharged in the radial directions impinges the guide 500, heats the outer surface of the rivet 1 and flows then to the outside.

When the rivet 1 is heated for a predetermined time, the moving unit is driven, and the forming tool 300 is lowered. In the state in which the forming tool 300 is brought into contact with the rivet 1, the forming tool 300 presses the upper end of the rivet 1. By this fact, the upper end of the rivet 1 is rolled outward by the curved portions formed on the lower end of the forming tool 300 and is gradually formed into the shape of a head as shown in FIGS. 7 and 8.

The guide 500, which is being lowered together with the forming tool 300, is stopped when the strippers 510 are brought into contact with the plate member 2. Then, as the forming tool 300 is continuously lowered, the spring 520 is compressed to accumulate elastic force.

Thereafter, when the forming tool 300 is fully lowered and the forming of the rivet 1 is completed, the supply of hot air is interrupted, and cold air is supplied through the cold air pipe 530 connected to the side of the guide 500. The cold air flows on the cooling fins 110 of the connection pipe 100 and the forming tool 300 and thereby cools the connection pipe 100 and the forming tool 300. In this way, the rivet 1 which is coming into contact with the forming tool 300 is cooled.

Once the cooling of the rivet 1 is completed, the supply of cold air is interrupted and the forming tool 300 is raised. When the forming tool 300 is raised beyond the predetermined distance, the guide 500 is raised along with the forming tool 300.

If the forming tool 300 is completely raised, the plate members 2 which have undergone the riveting operation are removed from the riveting apparatus, and new plate members are positioned in place to be ready for the riveting operation.

What is claimed is:

1. A riveting apparatus suitable for fastening a plurality of plate members by forming an end of a rivet, made of synthetic resin, into a shape of a head through heating and pressing, the apparatus comprising:
   a hot air pipe for supplying hot air;
   a connection pipe having a shape of a hollow tube and coupled to a lower end of the hot air pipe;
   a forming tool having a configuration in which a peripheral portion and a center portion project downward and portions extending therebetween have a concavely curved lower surface, having discharge holes which extend in axial and radial directions, and coupled to a lower end of the connection pipe so that hot air having passed through the connection pipe can be discharged through the discharge holes to heat the end of the rivet, thereby allowing the forming tool to form the end of the rivet into the shape of the head;
   a moving unit configured to move the forming tool upward and downward; and
   a guide configured to surround the forming tool so that hot air discharged through the discharge holes, which are defined in the forming tool and extend in the radial directions, can be directed toward the end of the rivet.

2. The riveting apparatus according to claim 1, wherein a plurality of cooling fins are formed on an outer surface of the connection pipe.

3. The riveting apparatus according to claim 1, wherein a plurality of grooves are defined on a lower end of the guide so that hot air can be discharged to outside after heating the end of the rivet.

4. The riveting apparatus according to claim 1, wherein a cold air pipe for supplying cold air is connected to the guide to cool the forming tool and the connection pipe after the end of the rivet is formed into the shape of the head.

5. The riveting apparatus according to claim 1, wherein the guide is installed in a manner such that it surrounds the connection pipe and can be moved upward and downward on the connection pipe, and a spring is disposed on the guide such that the guide presses the plate members by virtue of elastic force of the spring when the forming tool is lowered.

6. The riveting apparatus according to claim 5, wherein at least one stripper is coupled to an outer surface of the guide to project beyond a lower end of the guide so that the lower end can be prevented from being brought into direct contact with a surface of a plate member.

* * * * *